Oct. 24, 1944.  J. W. WHITE ET AL  2,361,139
METHOD OF FORMING TUBE CLAMPS
Filed Feb. 10, 1942
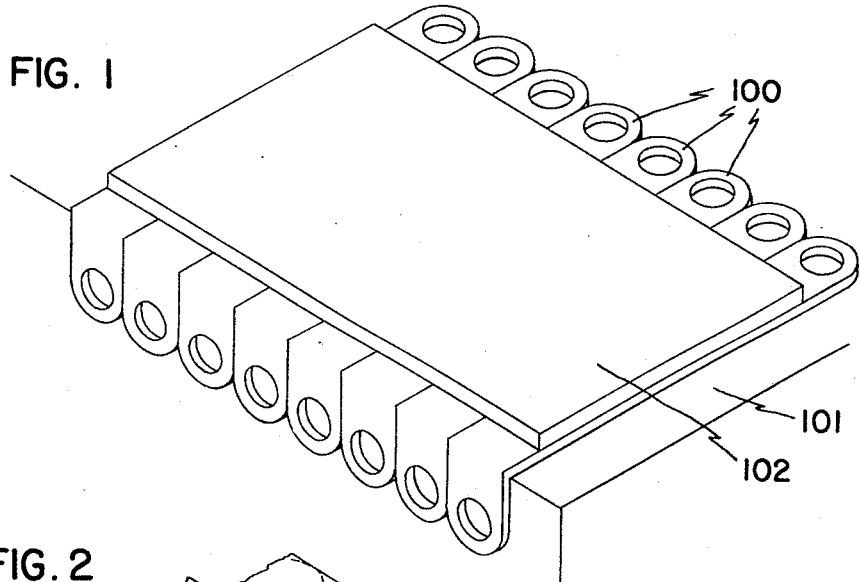
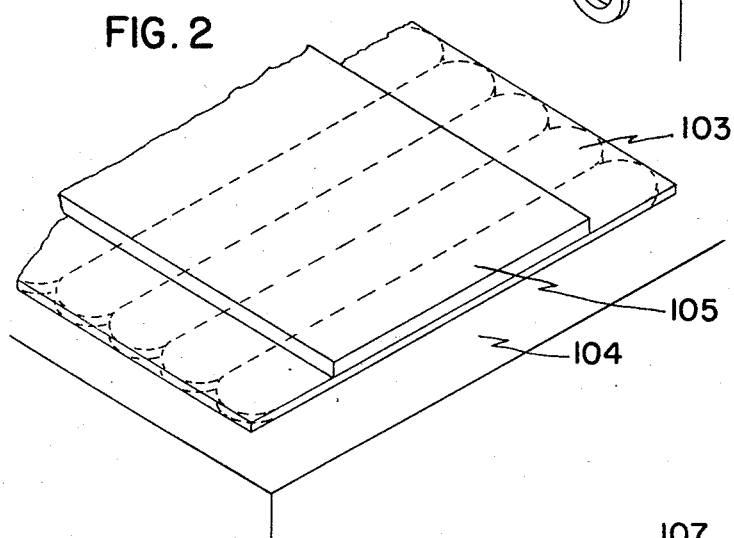
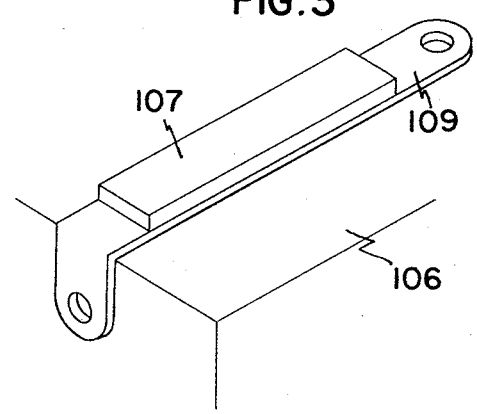
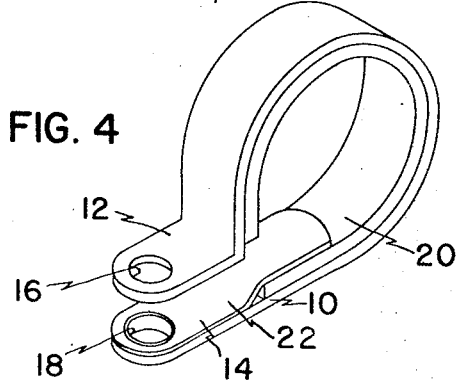
INVENTOR.
JOHN W. WHITE &
ROBERT R. HARRISON
BY
H. W. Brelsford
ATTORNEY Patented Oct. 24, 1944

2,361,139

UNITED STATES PATENT OFFICE 2,361,139

METHOD OF FORMING TUBE CLAMPS

John W. White and Robert R. Harrison, North Hollywood, Calif., assignors, by mesne assignments, to Bendix Aviation Corporation, South Bend, Ind., a corporation of Delaware Application February 10, 1942, Serial No. 430,207

2 Claims. (Cl. 29—150)

This invention relates to a method of making conduit holders and constitutes a continuation in part of an earlier filed application Serial Number 387,210, filed April 7, 1941.

Conduit holders are used in large numbers on airplanes, and in general comprise a loop of metal having a cushion element on the inner face thereof. The loop is placed around a conduit and the loop fastened to a supporting structure, thus securing a conduit to the structure. These conduits may be of any type, conduits for electrical conductors, conduits for hydraulic lines or fuel lines, and conduits for moveable rods or cables.

The requirements for airplane use are most stringent, and although our conduit holders are applicable to any type of vehicle, they are designed for use in aircraft and will be described with reference to airplane usage. The first requirement of a conduit holder is that it must securely hold the conduit to the support to which the conduit holder is fastened. There is often intense vibration and elastic structural movement in airplanes and if a plain metal band were used to secure a conduit to a support it would wear and gouge the conduit rendering it unserviceable. This fact has necessitated the cushioning of all metal holders or clamps.

A resilient material is best suited for this purpose so that a constant gripping of the conduit is produced. Rubber is the most satisfactory material, including synthetic rubbers as well as the natural rubber. Since synthetic rubbers are sometimes not called rubber, the term "rubber-like material" will be used in this application to include natural rubber, synthetic rubber and other materials having physical properties similar to rubber.

Conduit holders must be of a safe construction so that the cushioning element will not slip out of the metal band and thereby allow the metal to injure the conduit. A common requirement is that the bond between the metal and the cushion withstand the effects of oil and gasoline and severe vibration. Thus ordinary natural rubber cemented to a metal backing with ordinary cement could not meet these requirements as both the rubber and the cement would disintegrate under the action of oil and gasoline.

Another requirement of conduit holders for aircraft is that they must be light in weight. This necessitates the use of light weight metal for the holder, and the use of a minimum amount of cushioning material.

A tube or conduit holder for airplanes should also present no fire hazard and should if possible be immune to fire. Thus if cork were used as a cushioning element it would be unsatisfactory because it would burn readily. These fire requirements are important because conduit holders must be used in engine nacelles where high operating temperatures may exist and where fires sometime start.

The foregoing requirements are best met by conduit holders comprising a strip of metal formed in a loop shape having bonded to the inner face thereof a cushion of rubber-like material. The present invention relates to methods of making such conduit holders and these methods have been found particularly suited for mass production technique.

It is, therefore, an object of this invention to provide a method of making conduit holders having a cushion bonded on the inner surface thereof.

It is another object of the invention to provide methods for making a bonded cushion type conduit holder suitable for mass production techniques.

It is another object of the invention to provide methods of making a cushioned tube clamp wherein the bond between the metal and a cushion of rubber-like material is resistant to the effects of gasoline and oil.

Other objects and advantages of the invention will be apparent in the following description and claims, best understood when considered in connection with the accompanying drawing, in which:

Figure 1 shows one step in a process for forming tube or conduit holders comprising the application of a single sheet of cushion material to a plurality of metal blanks used to form conduit holders;

Figure 2 shows a step in another process of making conduit holders comprising the application of a sheet of cushion material to a sheet of metal, the cushioned metal blanks later being cut from the combination of the two materials;

Figure 3 shows a step in a third method of making tube or conduit holders comprising the application of a single cushion blank to a single metal blank from which a conduit holder is made; and Figure 4 is an isometric view of a conduit holder formed by any of the three methods of which a step is shown in the preceding figures.

Referring to Figure 4, a conduit holder is formed from a metal strip 10 having its intermediate portions bent in a substantially circular shape and having one end 12 bent at right angles to be parallel to the other end 14. Holes 16 and 18 are formed in the ends of the two ends respectively through which a screw or bolt may be passed to draw the two ends together and to secure the tube clamp as a whole to a supporting structure, in which position it is adapted to support a conduit passing therethrough. Bonded to the inner surface of the curved portion of strip 10 is a cushion element 20 of rubber-like material. This cushion keeps any conduit held in the clamp out of contact with the metal comprising the clamp and thus prevents injury to the conduit. Eyeleted to hole 18 is a conductor tag 22 to electrically ground a conduit held by the conduit holder to the metal strip 20.

As stated before, the cushion elements are composed of rubber-like material, which term has been defined as rubber, synthetic rubber-like compounds, and other substances having physical properties similar to rubber. A peculiar characteristic of this whole group of substances is that they are fabricated in much the same way as natural rubber: formed to shape in the uncured state and then cured by processes well known in the rubber art. It has been found that when a metal such as aluminum is coated with a bonding agent such as those disclosed in United States Patents 2,147,620 and 2,227,991, and an uncured rubber-like material is placed thereon and cured, that the rubber-like material will be securely bonded to the metal. If the rubber-like material is resistant to oil and gasoline in its cured state, the bond with which the cushion material is secured to the metal will also resist oil and gasoline. This discovery, made by others, is the basis for our method by which rubber-like substances are bonded to metal strips to form the cushions for conduit holders as described thus far in this application. We prefer, however, to modify the processes disclosed in the above named patents by applying on top of the bonding coat a coat of rubber-like cement which is preferably composed of the uncured cushion material dissolved in benzol or other solvent, without a curing agent dispersed therein. The addition of this rubber-like cement coat before applying the uncured material to the metal, results in a more secure bond than is produced by the use of the bonding agent alone.

In Figure 1 a plurality of metal strips 100 which are shaped and punched to form the strip of a conduit holder, are sand-blasted and laid side by side on a suitable bench or work table 101. A coating of bonding agent is next applied to the aligned metal strips 100, and this may be performed by spraying the liquid bonding agent thereon. After the bonding agent has dried for several minutes a cement of rubber-like character is next applied thereto preferably by spraying. A sheet 102 of uncured neoprene or other rubber-like material is then placed on the metal strips 100 and rolled or pressed by suitable tools to exclude any air bubbles and to press the sheet 102 securely against the metal strips 100. The assembly of the metal strips 100 and the sheet 102 is placed on a rack and inserted in a curing oven where the sheet 102 is cured under steam pressure at a suitable temperature. After the curing has been completed the assemblies are removed and the sheet 102 is slitted by knives along the joining lines of the strips 100. The conductor tag 22 is then applied to the strips 100. The individual metal strips 100 with the bonding cushion and conductor tag attached thereto are next bent into the finished shape, and the tube clamp is then ready for use.

From the foregoing description it is obvious that any rubber fabrication process that would result in a flat sheet of cushion material deposited on metal would be satisfactory. One common method of achieving this result is to mould a sheet of rubber-like material on the strips 100. Normally the moulded material could be cured thereon in the mold thus completing the depositing of material and curing the same in one operation. Thus when the phrase "applying sheet material" is used in the foregoing or following descriptions, this includes any process for obtaining this result, including moulding of material.

A modification of the process of Figure 1 is shown in Figure 2. Instead of first cutting metal strips to shape and then bonding a cushion thereto, the cushions are bonded to sheet metal and the unit composed of sheet metal and cushion is later cut to size and shape. A sheet of metal 103 is laid upon a suitable work surface 104. The bonding agent and rubber cement are next applied to the metal, and a sheet of uncured rubber-like material 105 is placed on the sheet metal 103. After rolling and curing, the assembly of sheet metal and cushion material is cut to size and shape, the conductor tag applied and the individual strips are then bent to the desired form.

A further modification of the process is shown in Figure 3 where a single metal strip 109 cut to shape is laid on a suitable work bench 106. After spraying and applying the cushion material 107 thereto the assembly is cured. After curing, the unit is then bent to shape and the finished tube clamp is then ready for use.

The methods described result in a tube clamp having an absolute minimum of cushioning element which is in great contrast to some types available on the market wherein a "snap-on" type of cushion is used requiring large amounts of cushion element for the means of attaching the cushion to the metal strip. The bond between the cushion and the metal strip is resistant to gasoline and to oil and only a very small amount of cushion element is exposed to any fire thus decreasing the chances of the cushion element burning in any application where there might be fire, such as an engine nacelle.

The methods described are particularly adapted to mass production technique and a relatively few men can turn out thousands of tube clamps in one day. Although the invention has been described with reference to particular embodiments thereof, it is not limited to these embodiments, nor otherwise except by the terms of the following claims.

We claim:

1. The method of making conduit holders which comprises aligning a plurality of strips side by side, placing a sheet of uncured rubber-like material over said strips, subjecting the assembly to high pressure and curing the rubber, cutting the rubber-like sheet along the edges of the strips, and bending the strips to shape.

2. The method of forming cushioned tube clamps comprising aligning a plurality of strips of metal, coating said strips with a bonding agent made in accordance with the prior art, coating said bonding agent with a cement composed of cushion material in solution, applying a single sheet of uncured cushion material to said strips, curing said cushion material to cause it to adhere to said strips, cutting said cushion between said strips, and bending said bonded strips to shape.

JOHN W. WHITE.
ROBERT R. HARRISON.